United States Patent
Choi et al.

(10) Patent No.: US 7,369,563 B2
(45) Date of Patent: May 6, 2008

(54) METHOD AND APPARATUS FOR SHARING A SINGLE INTERNET PROTOCOL ADDRESS WITHOUT A NETWORK ADDRESS TRANSLATION IN AN INTERNET ACCESS GATEWAY FOR A LOCAL NETWORK

(75) Inventors: Hyung-Suk Choi, Songnam-shi (KR); Kee-Ho Park, Yongin-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1038 days.

(21) Appl. No.: 10/436,093

(22) Filed: May 13, 2003

(65) Prior Publication Data

US 2003/0227930 A1    Dec. 11, 2003

(30) Foreign Application Priority Data

Jun. 5, 2002    (KR) ............... 10-2002-0031666

(51) Int. Cl.
*H04L 12/28* (2006.01)
*H04L 12/56* (2006.01)
(52) U.S. Cl. ...................... 370/401; 370/392
(58) Field of Classification Search ............ 370/401, 370/329, 389, 252, 400, 392, 475, 356, 351, 370/352; 709/223; 379/196, 114, 207
See application file for complete search history.

(56) References Cited

U.S. PATENT DOCUMENTS

| | | | |
|---|---|---|---|
| 4,706,080 A * | 11/1987 | Sincoskie | 340/825.02 |
| 6,233,234 B1 | 5/2001 | Curry et al. | |
| 6,282,281 B1 | 8/2001 | Low | |
| 6,470,389 B1 | 10/2002 | Chung et al. | |
| 6,501,746 B1 | 12/2002 | Leung | |

(Continued)

OTHER PUBLICATIONS

Volobuev, Yuri, "ARP and ICMP Redirection Games," Sep. 19, 1997.*

*Primary Examiner*—Wing Chan
*Assistant Examiner*—Prenell Jones
(74) *Attorney, Agent, or Firm*—Robert E. Bushnell, Esq.

(57) ABSTRACT

Disclosed is a technique which can share single public Internet protocol without a network address translation when a plurality of computers use the Internet through an Internet access gateway. The Internet access gateway according to the invention includes a local network access point which is connected to a local network for either inputting or outputting a packet either to local network or therefrom; an Internet access point which is connected to the Internet for either inputting or outputting the packet either to the Internet or therefrom; a port translation table for storing nodes having one Internet protocol address, public port numbers corresponding to each of the nodes, a local port number corresponding to each of the nodes, and a media access control (MAC) address corresponding to each of the nodes; and an address translation processor for changing a public port number using a local port number and the MAC address included in an Internet protocol packet as delimiters in a predetermined assigning manner when the Internet protocol packet is received at the local network, storing a changed public number in the port translation table, for a public port number corresponding to an Internet protocol packet with reference to the port translation table when the Internet protocol packet is received at the Internet, and searching for a local port number corresponding to the public port number.

18 Claims, 10 Drawing Sheets

U.S. PATENT DOCUMENTS

| | | |
|---|---|---|
| 6,507,589 B1 | 1/2003 | Ramasubramani et al. |
| 6,513,129 B1 | 1/2003 | Tentij et al. |
| 6,516,345 B1 | 2/2003 | Kracht |
| 6,788,682 B1 * | 9/2004 | Kimmitt ..................... 370/389 |
| 2003/0007486 A1 * | 1/2003 | March et al. ............... 370/389 |

* cited by examiner

| | DESTINATION MAC | SRC MAC | DESTINATION IP | DESTINATION PORT | SRC IP | SRC PORT | DATA |
|---|---|---|---|---|---|---|---|
| (1) | 0000F0 000001 | 0000F0 111102 | 108.100.1.7 | 0x0078 | 10.0.0.2 | 0x100c | DATA 10.0.0.2 |
| (2) | | | 108.100.1.7 | 0x0078 | 10.0.0.2 | 0x100c | DATA 10.0.0.2 |
| (3), (4) | | | 108.100.1.7 | 0x0078 | 211.198.1.1 | 0x2000 | DATA 10.0.0.2 |

FIG.3

|   | DESTINATION IP | DESTINATION PORT | SRC IP | SRC PORT | |
|---|---|---|---|---|---|
| (5), (6) | 211.198.1.1 | 0x2000 | 108.100.1.7 | 0x0078 | DATA 10.0.0.2 |

|   | DESTINATION IP | DESTINATION PORT | SRC IP | SRC PORT | |
|---|---|---|---|---|---|
| (7) | 10.0.0.2 | 0x100c | 108.100.1.7 | 0x0078 | DATA 10.0.0.2 |

|   | DESTINATION MAC | SRC MAC | DESTINATION IP | DESTINATION PORT | SRC IP | SRC PORT | |
|---|---|---|---|---|---|---|---|
| (8) | 0000F0 111102 | 0000F0 000001 | 10.0.0.2 | 0x100c | 108.100.1.7 | 0x0078 | DATA 10.0.0.2 |

FIG.4

| | DESTINATION MAC | SRC MAC | DESTINATION IP | DESTINATION PORT | SRC IP | SRC PORT | |
|---|---|---|---|---|---|---|---|
| (1) | 0000F0 000001 | 0000F0 111102 | 108.100.1.7 | 0x0078 | 211.198.1.1 | 0x100c | DATA 211.198.1.1 |

| | DESTINATION IP | DESTINATION PORT | SRC IP | SRC PORT | |
|---|---|---|---|---|---|
| (2) | 108.100.1.7 | 0x0078 | 211.198.1.1 | 0x100c | DATA 211.198.1.1 |

| | DESTINATION IP | DESTINATION PORT | SRC IP | SRC PORT | |
|---|---|---|---|---|---|
| (3), (4) | 108.100.1.7 | 0x0078 | 211.198.1.1 | 0x2000 | DATA 211.198.1.1 |

FIG.8

| | DESTINATION IP | DESTINATION PORT | SRC IP | SRC PORT | |
|---|---|---|---|---|---|
| (5), (6) | 211.198.1.1 | 0x2000 | 108.100.1.7 | 0x0078 | DATA 211.198.1.1 |

| | DESTINATION IP | DESTINATION PORT | SRC IP | SRC PORT | |
|---|---|---|---|---|---|
| (7) | 211.198.1.1 | 0x100c | 108.100.1.7 | 0x0078 | DATA 211.198.1.1 |

| | DESTINATION MAC | SRC MAC | DESTINATION IP | DESTINATION PORT | SRC IP | SRC PORT | |
|---|---|---|---|---|---|---|---|
| (8) | 0000F0 111102 | 0000F0 000001 | 211.198.1.1 | 0x100c | 108.100.1.7 | 0x0078 | DATA 211.198.1.1 |

FIG.9

METHOD AND APPARATUS FOR SHARING A SINGLE INTERNET PROTOCOL ADDRESS WITHOUT A NETWORK ADDRESS TRANSLATION IN AN INTERNET ACCESS GATEWAY FOR A LOCAL NETWORK

CLAIM OF PRIORITY

This application makes reference to, incorporates the same herein, and claims all benefits accruing under 35 U.S.C. §119 from an application for METHOD AND APPARATUS FOR SHARING A SINGLE INTERNET PROTOCOL ADDRESS, WITHOUT CONVERTING NETWORK ADDRESS IN AN INTERNET ACCESS GATEWAY FOR LOCAL NETWORK earlier filed in the Korean Industrial Property Office on Jun. 5, 2002 and there duly assigned Serial No. 2002-31666.

BACKGROUND OF THE INVENTION

1. Field of the Invention

The present invention relates to an Internet access gateway (hereinafter, referred to as IAG) connected to the Internet, and more particularly to an IAG for sharing a single public Internet protocol (hereinafter, referred to as IP) address without a network address translation (hereinafter, referred to as NAT).

2. Description of the Related Art

A local network consists of computers (or personal computers; hereinafter, referred to as PCs) connected with one another by a wireless LAN (Local Area Network). The local network is connected through the IAG with the Internet. For example, the IAG includes customer premise equipment (hereinafter, referred to as CPE), carrier leased equipment (hereinafter, referred to as CLE), etc.

IP addresses must be assigned to information terminals such as the PCs which are connected to a local network of an office, a SOHO (Small Office/Home Office), a home, etc., so that the information terminals may access the Internet. In order to allow the plurality of PCs to access the Internet, the plurality of IP addresses should be assigned to the plurality of PCs. However, it is difficult to assign all the PCs individual IP addresses because the number of IP addresses are insufficient. For solving this problem, NAT and/or PAT (Port Address Translation) have/has been used for allowing the plurality of PCs to share one IP address.

That is, the PC connected to a local network uses a private IP address, and the private IP address is changed to any public IP address assigned to it in CPE or CLE in which the local network is connected to the Internet. Also, port number fields of IP packet fields are differently assigned according to PCs, thereby distinguishing paths of IP packets.

Though a head field of an IP packet, that is, an IP address or a port number, is translated, the IP address in a data field remains as a private address. Therefore, if a system is programmed to confirm that an applied program of a receiving server is not a port number but a data field and thus to respond to it, the system may cause a malfunction or the packet may be transmitted to the Internet in a wrong way. That is, because the receiving server, which receives a packet, reads out not a public IP address from the SRC IP (source Internet protocol) field of the packet but a private IP address from the data field, the receiving server does not correctly determine what is the transmission part and responds as per the wrong part.

Using private IP addresses and changing the private IP addresses to public IP addresses using NAT/PAT, causes a problem since the position at which the IP address is placed is not unified as in a case that an IP information is copied into the data field of a packet.

SUMMARY OF THE INVENTION

It is therefore, an object of the present invention is to provide IAG (Internet access gateway) and a method thereof to share a single public IP address without performing NAT.

It is another object to provide an Internet access gateway and a technique of an Internet access gateway that prevents Internet protocol conflicts including at the Internet access point.

It is yet another object to provide an Internet access gateway and a technique of an Internet access gateway to efficiently and simply share a single public Internet protocol address.

In order to accomplish the above and other objects, there is provided an Internet access gateway including: a local network access point which is connected to a local network for either inputting or outputting a packet either to or from a local network; an Internet access point which is connected to the Internet for either inputting or outputting the packet either to or from the Internet; a port translation table for storing nodes having one Internet protocol address, public port numbers corresponding to each of the nodes, a local port number corresponding to each of the nodes, and a media access control (MAC) address corresponding to each of the nodes; and an address translation processor for changing a public port number using a local port number and the MAC address included in an Internet protocol packet as delimiters in a predetermined assigning manner when the Internet protocol packet is received at the local network, for storing a changed public number in the port translation table, for searching for a public port number corresponding to an Internet protocol packet with reference to the port translation table when the Internet protocol packet is received at the Internet, and for searching for a local port number corresponding to the public port number.

In accordance with another aspect of the present invention, there is provided a method of sharing a single Internet protocol address without a network address translation in an Internet access gateway for a local network. The method includes: assigning a single Internet protocol address to one or more computers, being computers which share a single Internet protocol address in the local network; checking whether an Internet protocol packet is received at the local network; changing a public port number using a local port number and an MAC address included in the Internet protocol packet as delimiters in a predetermined assigning manner when the Internet protocol packet is received at the local network, and recording a changed public port number on a port translation table; checking whether an Internet protocol packet has been received at the Internet; and when the Internet protocol packet is received at the Internet, after searching the port translation table for a public port number which corresponds to a destination port number, searching for a local port number corresponding to the public port number.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 and FIG. 4 are views showing packet formats in each step of translating the received packet in FIG. 2;

FIG. 8 and FIG. 9 are views showing formats of received packets in each of the translation steps;

DETAILED DESCRIPTION OF THE PREFERRED EMBODIMENTS

Figure 1:
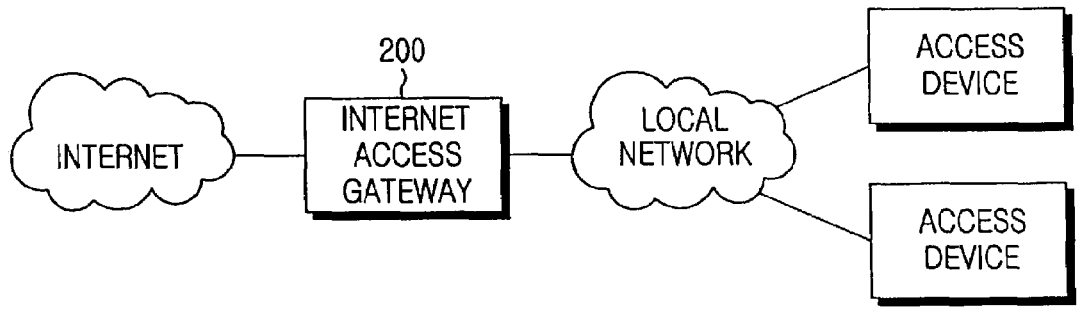
FIG. 1 is a view showing a local network and the Internet connected through IAG with each other.

Turning now to the drawings, FIG. 1 is a view showing a local network and the Internet connected through IAG with each other.

The local network consists of computers (or personal computers; hereinafter, referred to as PCs) connected with one another by a wireless LAN (Local Area Network). The local network is connected through the IAG 200 with the Internet. For example, the IAG 200 includes customer premise equipment (hereinafter, referred to as CPE), carrier leased equipment (hereinafter, referred to as CLE), etc.

IP addresses must be assigned to information terminals such as the PCs which are connected to a local network of an office, a SOHO (Small Office/Home Office), a home, etc., so that the information terminals may access the Internet. In order to allow the plurality of PCs to access the Internet, the plurality of IP addresses should be assigned to the plurality of PCs. However, it is difficult to assign all the PCs individual IP addresses because the number of IP addresses are insufficient. For solving this problem, NAT and/or PAT (Port Address Translation) have/has been used for allowing the plurality of PCs to share one IP address.

That is, the PC connected to a local network uses a private IP address, and the private IP address is changed to any public IP address assigned to it in CPE or CLE in which the local network is connected to the Internet. Also, port number fields of IP packet fields are differently assigned according to PCs, thereby distinguishing paths of IP packets.

Figure 2:
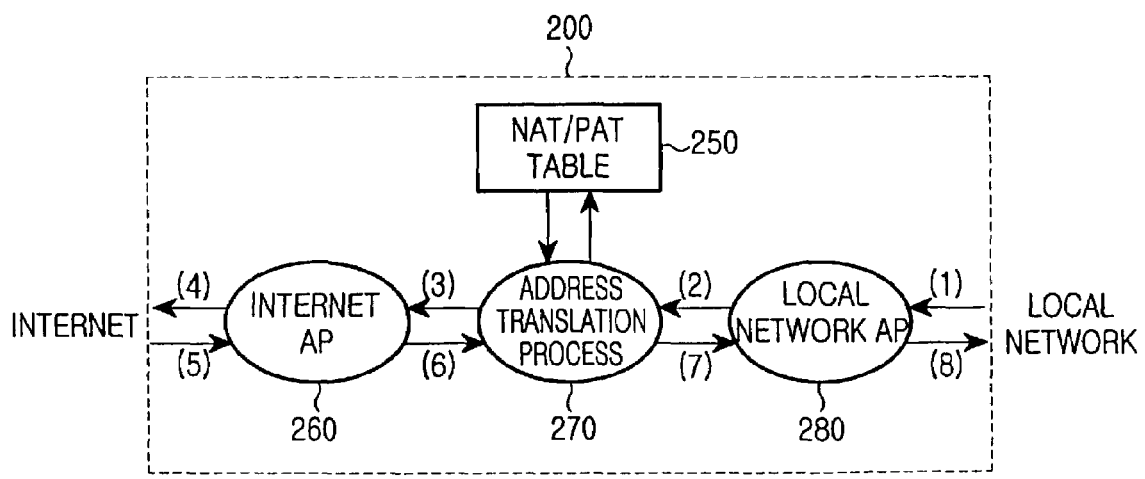
FIG. 2 a view showing a process in which the Internet access gateway in FIG. 1 translates a packet received at the Internet or a local network.

FIG. 2 is a view showing a process in which the Internet access gateway in FIG. 1 translates a packet received at the Internet or a local network. FIGS. 3 and 4 are views showing packet formats in each step of translating the received packet in FIG. 2, focusing on related parameters.

Referring to FIG. 2, a local network access point 280 is connected to the local network, and inputs or outputs a packet. An Internet access point 260 is connected to the Internet and inputs or outputs a packet. An NAT/PAT table 250 has information concerning network address translation and port address translation to make it possible to allow the plurality of PCs to share a single IP address. An address translation processor 270 performs the network address translation and the port address translation with reference to the NAT/PAT table 250.

The following table 1 is one example of an NAT/PAT table related to a packet transmission or a packet reception as depicted in FIG. 2, assuming that the public IP address assigned to the CPE is 211.198.1.1 and private IP addresses, 10. 0. 0. 1~10. 0. 0. 9 are assigned to PCs, respectively. Further, it will be assumed that nine numbers of 0000F0111101~0000F0111109 are assigned to MAC (media access control) addresses of nine PCs in the local network and an MAC address of the IAG 200 is 0000F0000001.

TABLE 1

| Public IP Address | Public Port Number | Private IP Address | Local Port Number | MAC Address |
|---|---|---|---|---|
| 211.198.1.1 | 0 × 1000 | 10.0.0.1 | 0 × 100c | 0000F0 111101 |
| 211.198.1.1 | 0 × 2000 | 10.0.0.2 | 0 × 100c | 0000F0 111102 |
| 211.198.1.1 | . . . | . . . | . . . | . . . |
| 211.198.1.1 | 0 × 9000 | 10.0.0.9 | 0 × 300a | 0000F0 111109 |

Figure 5:
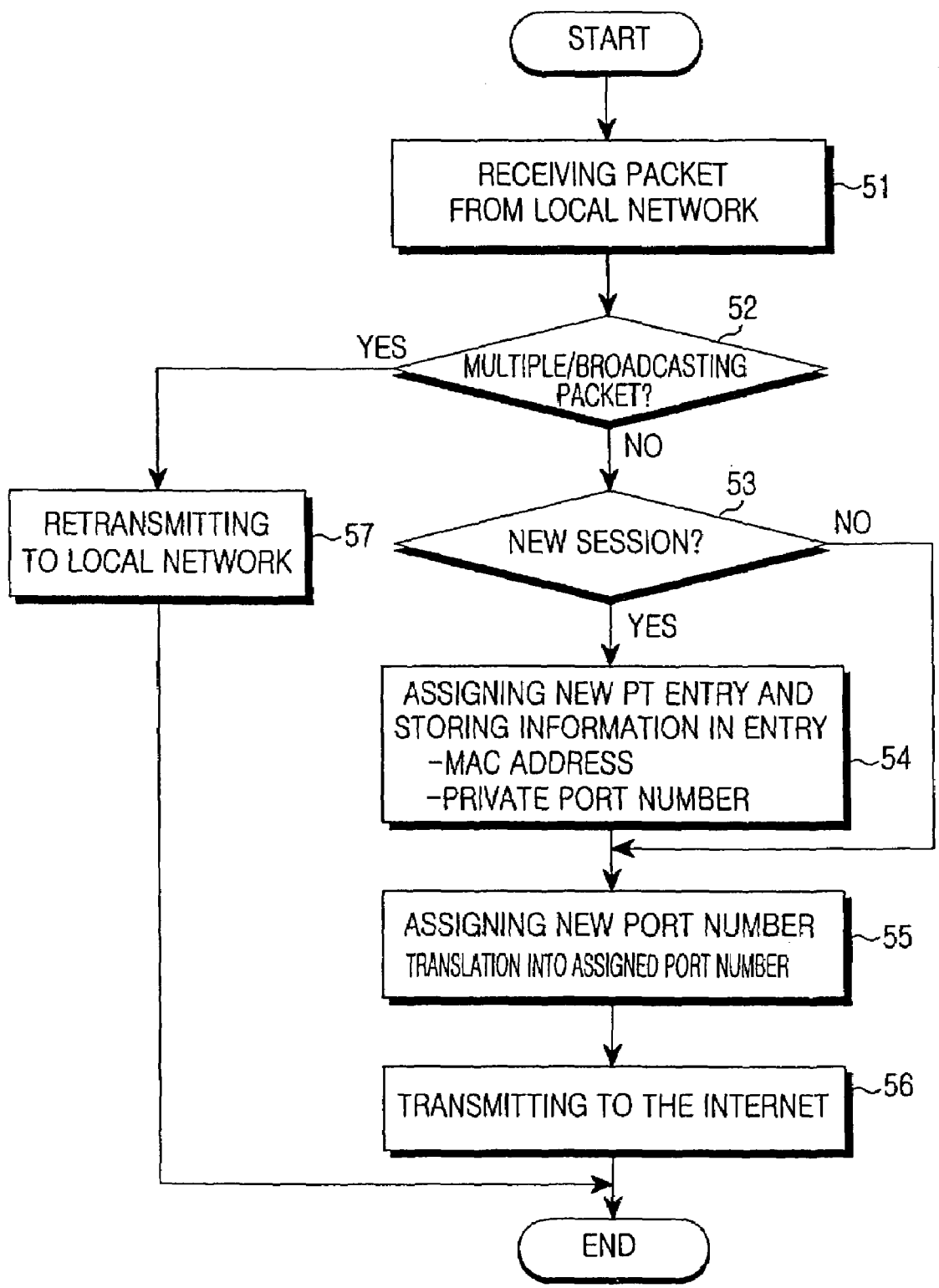
FIG. 5 is a flowchart showing the steps of receiving packets from the local network at the Internet access gateway of FIG. 1.

Giving an example of a format of an IP address received at the IAG 200 of the local network, as shown in (2) and (3) of FIG. 3, SRC IP has a public IP address of 10. 0. 0. 2 and a private IP address of 10. 0. 0. 2 in (2), but the public IP address is 211. 198. 1. 1 while the private IP address remains 10. 0. 0. 2 in (3) due to NAT which is performed. Further, in (2) of FIG. 3, an SRC port has the local port number of 0x100c, and is changed to the public port number of 0x2000 in (3). Steps 51~57 in FIG. 5 show a process of transmitting packets to the Internet after receiving packets from the local network and performing the packet format translation, as mentioned above. Particularly, in step 52, when the received packet is a multiple/broadcasting packet, the received packet is retransmitted to the local network in step 57 and the process is completed.

Figure 6:
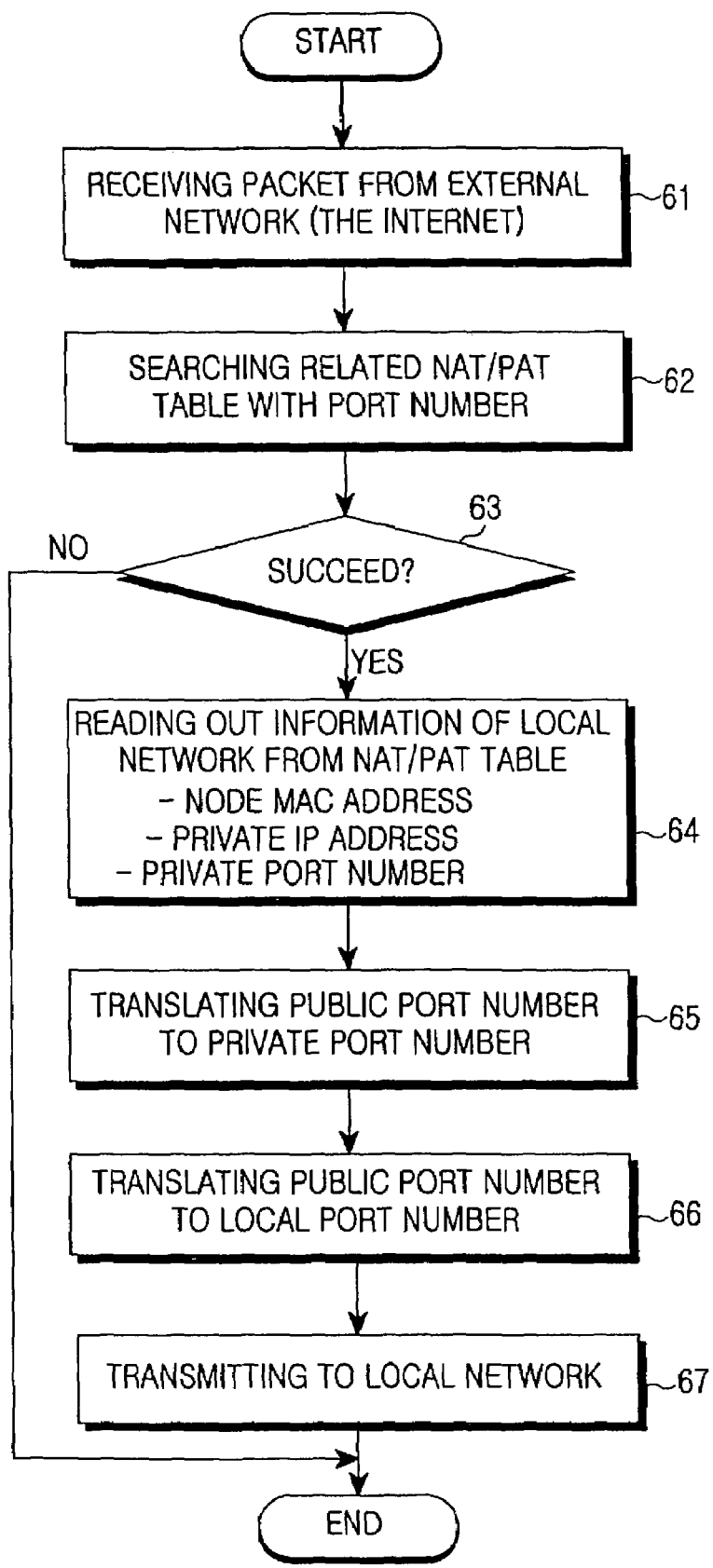
FIG. 6 is a flowchart showing the steps of receiving packets from the Internet at the Internet access gateway of FIG. 1.

Giving an example of a format of an IP packet received at IAG 200, as shown in (5), (6), and (7) of FIG. 4, the destination IP address is a public IP address of 211.198.1.1 in (5) and (6), but the destination IP is changed to a private IP address of 10.0.0.2 in (7). Further, the destination port is a public port number of 0x2000 in (5) and (6), but the destination IP is changed to a local port number of 0x100c in (7). Steps 61~67 in FIG. 6 show a process of transmitting packets to the local network after receiving packets at an external network (the Internet) and performing the packet format translation, as mentioned above.

In this way, though a head field of an IP packet, that is, an IP address or a port number, is translated, the IP address in a data field remains as a private address. Therefore, if a system is programmed to confirm that an applied program of a receiving server is not a port number but a data field and thus to respond to it, the system may cause a malfunction or the packet may be transmitted to the Internet in a wrong way. That is, because the receiving server, which receives a packet having a format such as (3) or (4) of FIG. 3, reads out not a public IP address from the SRC IP field of the packet but a private IP address from the data field, the receiving server does not correctly determine what is the transmission part and responds as per the wrong part.

As mentioned in the above examples, which uses private IP addresses and changes them to public IP addresses using NAT/PAT, causes a problem since the position at which the IP address is placed is not unified as in a case that an IP information is copied into the data field of a packet.

Hereinafter, an Internet access gateway and a method thereof according to preferred embodiments of the present invention will be described with reference to the accompanying drawings. It is to be kept in mind that the same reference numerals are used for the same elements in the drawings. Though many particular details such as devices with circuits are described below, these are provided only for helping to generally understand the present invention, and it is obvious that they are to implement the present invention without the particular details. In the following description of the present invention, a detailed description of known functions and configurations incorporated herein will be omitted when it may make the subject matter of the present invention rather unclear.

Figure 7:
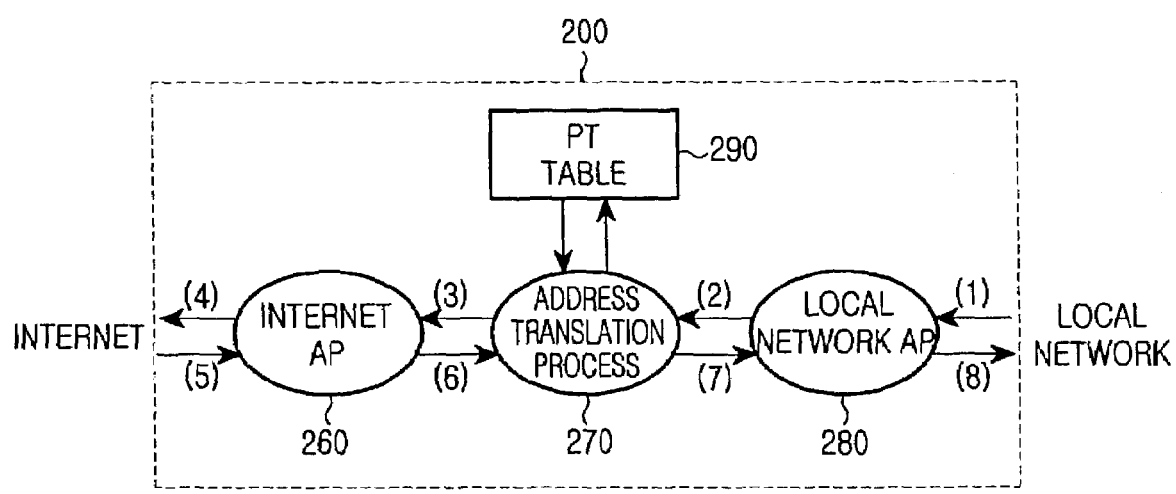
FIG. 7 is a view schematically showing a translation of packets received from the Internet or a local network by an Internet access gateway according to an embodiment of the present invention.

FIG. 7 is a view schematically showing a translation of packets received from the Internet or a local network by an Internet access gateway according to an embodiment of the present invention.

A local network access point 280 is connected to a local network and inputs or outputs packets. An Internet access point 260 is connected to the Internet and inputs or outputs packets. A port translation (hereinafter, referred to as PT) table 290 has information for changing the Internet protocol used in the local network according to the public Internet protocol address. An address translation processor 270 performs the changing with reference to the PT table 290.

The local network shares a single public Internet protocol address.

FIG. 8 and FIG. 9 are views showing formats of received packets in each of the translation steps.

Describing an operation condition of the present invention, the local network is limited to systems which cause PCs to communicate with one another always via a local access point, such as a wireless LAN. These systems have a characteristic in that all packets are collected at the access point in the Internet access gateway having a wireless LAN as a means of a home network and are transmitted to destination nodes, that is, PCs.

According to the IP assigning method of the present invention, the same public IP address is assigned to nodes using the Internet such as a PC or an IP phone. This may be a method of assigning automatically according to network providers. Also, though this may perform configuration before operating, the same single IP address assigned is assigned to all PCs which share the IP address.

Operation of IAG according to the present invention will be described in detail below.

As another way that is different from FIG. 5, IAG according to the present invention prevents broadcasting packets received at a PC from being transmitted to any other node in the local network. This may be understood through the fact that work is completed in the case of a multiple/broadcasting packet in the step 102 of FIG. 10 which will be described below. Therefore, an address resolution protocol and a broadcasting packet outputted from the PC are not transmitted to any other node in the local network, so that IP conflict is not caused even though the same IP is assigned.

Referring to FIG. 8, local port numbers and MAC addresses of IP packets transmitted from the local network, (e.g., PCs) are referred to generate public port numbers in a predetermined assigning manner. Also, this changing is recorded on a PT table 290 of FIG. 7, such as the following table 2.

TABLE 2

| Index | IP address | Public Port No. | Local Port No. | MAC Address |
|---|---|---|---|---|
| 1 | 211.198.1.1 | 0 × 1000 | 0 × 1000 | 0000F0 111101 |
| 2 | 211.198.1.1 | 0 × 2000 | 0 × 100c | 0000F0 111102 |
| ... | 211.198.1.1 | ... | ... | ... |
| 9 | 211.198.1.1 | 0 × 9000 | 0 × 1000 | 0000F0 111109 |

In Table 2, the IP addresses are assigned public IP addresses. The public port numbers are port numbers changed according to each PC. The local port numbers are port numbers assigned in TCP/IP (transmission control protocol and Internet protocol) communication modules of PCs. The MAC addresses are MAC addresses used in layer 2 of the local network.

Taking a format of an IP packet received at IAG 200 as an example, as shown in FIG. 7, the SRC port number has the local port number of 0x100c in cases of (1) and (2), but in cases of (3) and (4), the SRC port number is changed to the public port number of 0x2000. Compared with FIG. 3 mentioned above, there is no need to change the SRC IP. Steps 101~106 of FIG. 10 show a process in which the Internet access gateway 200 of FIG. 7 receives a packet from the local network and after performing the above format translation, transmits a translated packet to an external network (the Internet).

Figure 10:
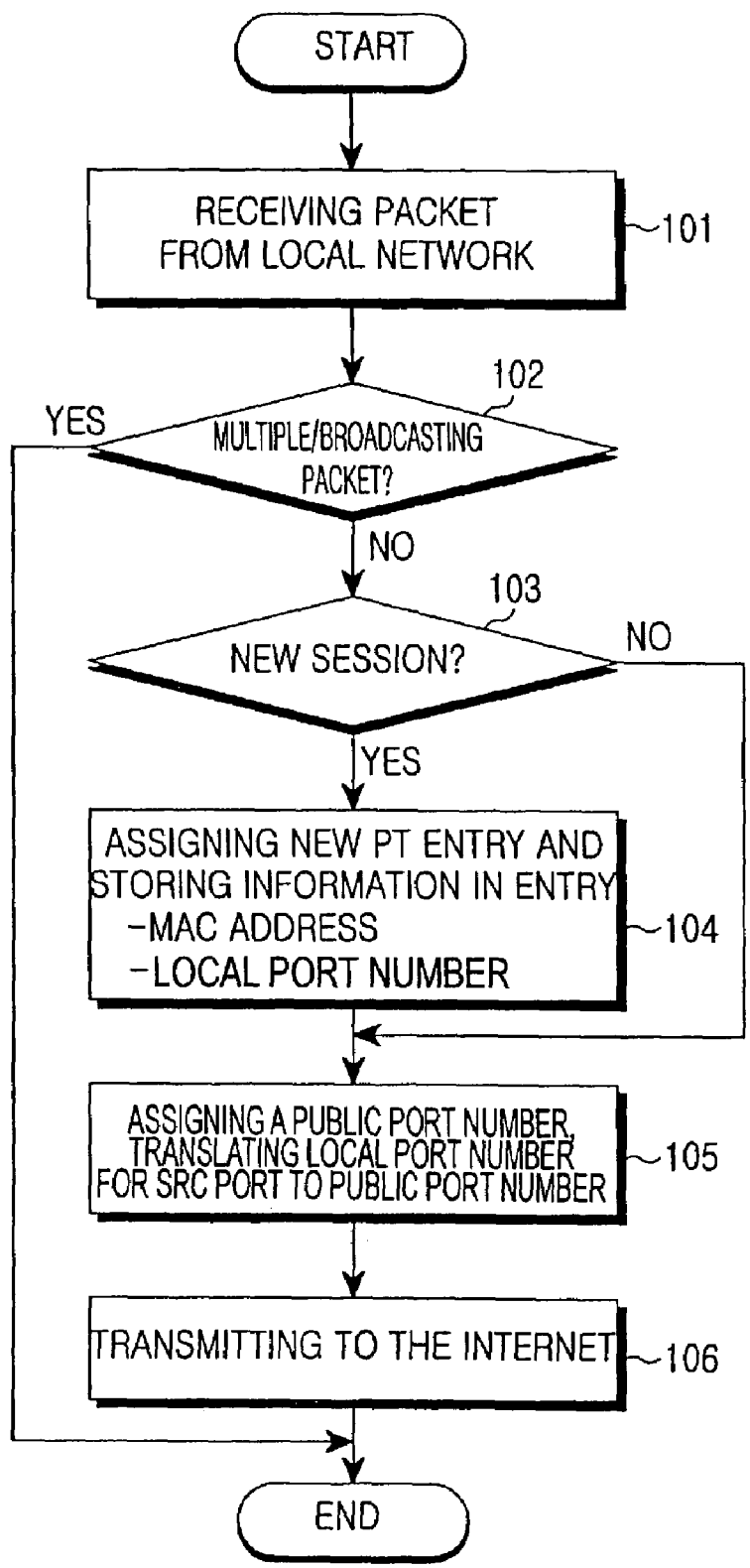
FIG. 10 is a flowchart showing a process in which the Internet access gateway depicted in FIG. 5 receives packets from the local network.

Referring to FIG. 10, the packet is received from the local network (step 101). After receiving the packet, a determination is made whether the packet is a multiple/broadcasting packet (step 102). Work is completed when the packet is a multiple/broadcasting packet. However, if the packet is not a multiple/broadcasting packet, then a determination is made whether there is a new session (step 103). If there is a new session, then there is an assignment of a new port translation table entry and storing information in the entry concerning the MAC address and local port number (step 104). If there is no new session (step 103) or when step 104 completes, there are an assigning of a new port number as a public port number and a translating of port number for SRC port, wherein a local port number for the SRC port is translated into the assigned new port number (step 105) and then the translated packet is transmitted to an external network like the Internet (step 106).

Referring to FIG. 9, a destination port number of an IP packet field of a received IP packet from the Internet is used as a key value for searching for a destination PC. The destination PC is found by determining whether the destination port number is matched with one of the public port numbers of PT table 290. Also, the destination port number is translated into a real local port number, and the IP packet is transmitted to the local network.

Taking a format of an IP packet received at IAG 200 of FIG. 7 as an example, as shown in FIG. 9, the destination port number has the public port number of 0x2000 in cases of (5) and (6), but in cases of (7) and (8), the destination port number is changed to the local port number of 0x100c. Compared with FIG. 4 mentioned above, there is no need to change the destination IP.

Figure 11:
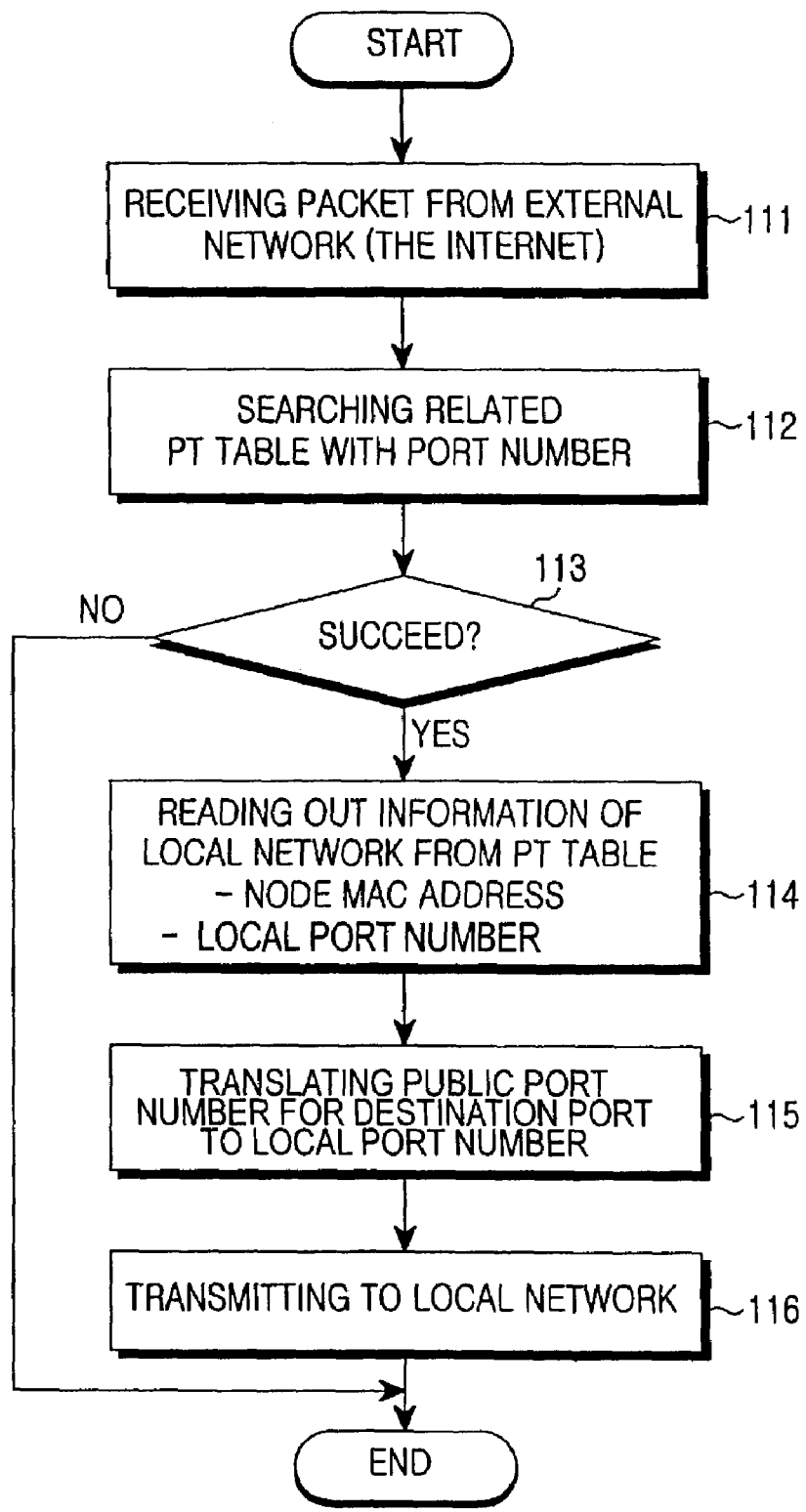
FIG. 11 is a flowchart showing a process in which the Internet access gateway depicted in FIG. 5 receives packets from the Internet.

Steps 111~116 of FIG. 11 show a process that the Internet access gateway 200 of FIG. 7 receives a packet from an external network (the Internet) and after performing the above format translation, transmits a translated packet to the local network.

Referring to FIG. 11, a packet is received from an external network such as the Internet (step 111), then there is a searching related port translation table with the port number (step 112), and then a determination is made whether there is a success in searching related port translation table with the port number (step 113). If there is no success, then the procedure completes. However, if there is success in step 113, then there is a reading out of information of the local network from the port translation table concerning the node MAC address and local port number (step 114). After step 114, there is a translating of public port number to the local port number (step 115), and finally the translated packet is transmitted to the local network (step 116).

According to the present invention mentioned above, the same public IP is assigned to the plurality of PCs to access the Internet. For transmitting packets received through the same IP address to each of destination PCs, port numbers are only changed without changing of IP addresses of the packets by using the port numbers and MAC addresses as delimiters. Further, by cutting off the broadcasting packets, which are received at the local network, an IP conflict is prevented at the Internet access point.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An Internet access gateway, comprising:
   a local network access point connected to a local network for accommodating any one of inputting and outputting of a packet to and from, respectively, a local network;
   an Internet access point connected to the Internet for accommodating any one of inputting and outputting the packet to and from, respectively, the Internet;
   a port translation table for accommodating storing nodes having identical Internet protocol address, public port numbers corresponding to each of the nodes, a local port number corresponding to each of the nodes, and a media access control address corresponding to each of the nodes; and
   an address translation processor for generating a public port number using a local port number and the media access control address included in an Internet protocol packet in a predetermined assigning manner when the Internet protocol packet is received at the local network, for storing said generated public number in the port translation table, for searching for a public port number corresponding to an Internet protocol packet with reference to the port translation table when the Internet protocol packet is received at the Internet, and for searching for a local port number corresponding to the public port number.

2. The Internet access gateway of claim 1, further comprising means for completing work when the packet is a multiple and broadcasting packet.

3. The Internet access gateway of claim 1, further comprising means for completing work when the packet is a multiple and broadcasting packet after receiving the packet from the local network.

4. The Internet access gateway of claim 1, further comprising means for preventing Internet protocol packets received at a computer in said local network from being transmitted to any other node in said local area network.

5. The Internet access gatway of claim 2, wherein an address resolution protocol and a broadcasting packet outputted from a computer in said local network are not transmitted to any other node in said local network to prevent Internet protocol conflict.

6. The Internet access gatway of claim 1, further comprising means for assigning a same public Internet protocol address to all nodes included in said local network and using the Internet.

7. The Internet access gateway of claim 6, further comprising means for completing work when the packet is a multiple and broadcasting packet.

8. A method of sharing a single Internet protocol address without a network address translation in an Internet access gateway for a local network, the method comprising the steps of:
   assigning a single Internet protocol address to a plurality of computers, said computers sharing the single Internet protocol address in the local network;
   checking whether an Internet protocol packet is received at the local network;
   generating a public port number using a local port number and a media access control address included in the Internet protocol packet in a predetermined assigning manner when the Internet protocol packet is received at the local network, and recording said generated public port number on a port translation table;
   checking whether an Internet protocol packet has been received at the Internet; and
   when the Internet protocol packet is received at the Internet, after searching the port translation table for a public port number which corresponds to a destination port number, searching for a local port number corresponding to the public port number.

9. The method of claim 8, further comprising the step of completing work when the packet is a multiple and broadcasting packet.

10. The method of claim 8, further comprising the step of completing work when the packet is a multiple and broadcasting packet after receiving the packet from the local network.

11. The method of claim 8, further comprising the step of preventing Internet protocol packets received at a computer in said local network from being transmitted to any other node in said local area network.

12. The method of claim 9, wherein a computer in said local network does not transmit an address resolution protocol and a broadcasting packet outputted from the computer to any other node in said local network to prevent Internet protocol conflict.

13. A method, comprising the steps of:
   receiving a packet from a local area network;
   determining whether the packet is a multiple and broadcasting packet;
   completing work when the packet is a multiple and broadcasting packet;
   determining whether there is a new session when the packet is not a multiple and broadcasting packet;
   assigning a new port translation table entry and storing information in the new port translation table entry concerning a media access control address and local port number of the packet;
   assigning a new port number and changing a destination port number into the new port number; and
   transmitting the packet to an external network by the destination port number.

14. The method of claim 13, further comprising the steps of assigning a same public Internet protocol address to all nodes included in said local network, and using the Internet.

15. The method of claim 14, said external network being the Internet.

16. A method, comprising the steps of:
receiving a packet from an external network;
searching a related port translation table with a public port number as a destination port number;
determining whether there is a success in searching the related port translation table with the public port number;
completing a procedure when there is no success in the searching;
reading out information of a local network from the port translation table concerning a node media access control address and the local port number;
changing the destination port number into the local port number; and
transmitting the packet to the local network, including a plurality of computers, by the destination port number.

17. The method of claim 16, further comprising the steps of assigning a same public Internet protocol address to all nodes included in said local network, and using the Internet.

18. The method of claim 16, said external network being the Internet.

* * * * *